(Model.)
E. R. JONES.
CLOVER THRASHER AND HULLER.
No. 278,336. Patented May 29, 1883.
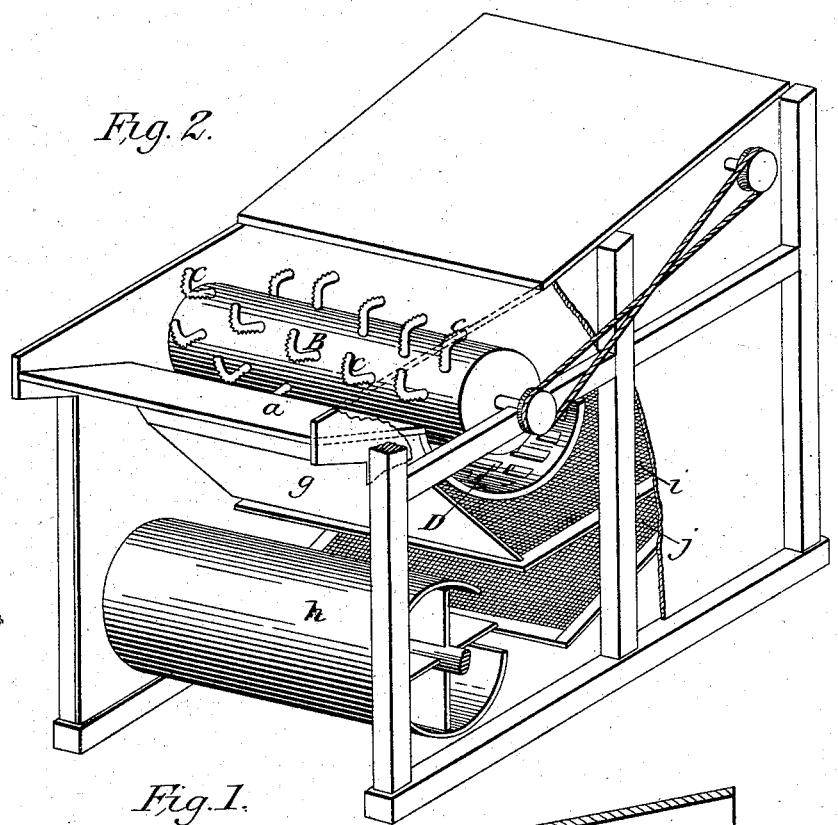
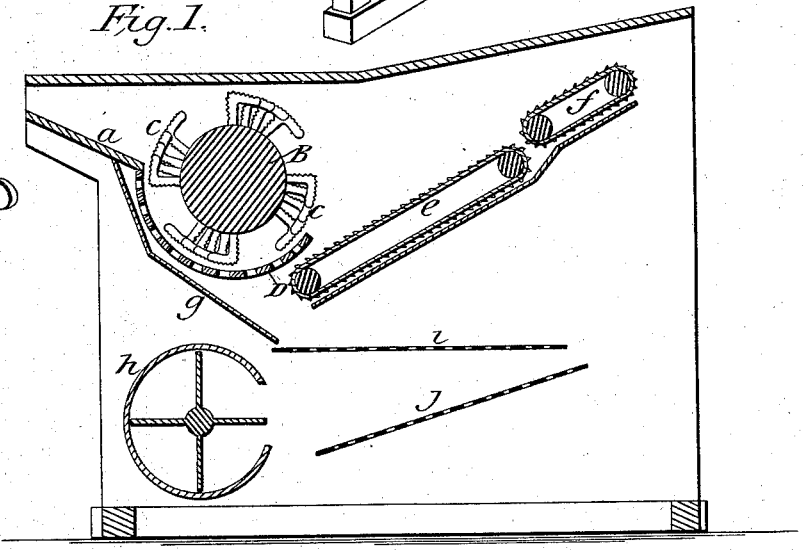
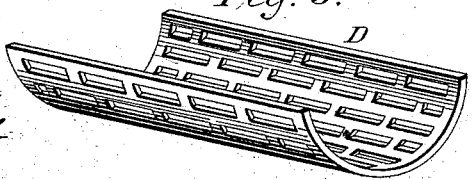
Witnesses:
B. Exley Jr.
M. C. Mitchell
Inventor:
Edwin R. Jones.

UNITED STATES PATENT OFFICE.

EDWIN R. JONES, OF MARTIN'S FERRY, OHIO.

CLOVER THRASHER AND HULLER.

SPECIFICATION forming part of Letters Patent No. 278,336, dated May 29, 1883.

Application filed March 18, 1882. (Model.)

*To all whom it may concern:*

Whereas EDWIN R. JONES, then of Moorefield, county of Harrison, and State of Ohio, and JOHN W. GRUBBS, of Cannonsburg, county of Washington, and State of Pennsylvania, obtained Letters Patent for a Clover Thrasher and Huller, No. 211,472, United States Patent Office, dated January 21, 1879: Be it known that I, the said EDWIN R. JONES, now of Martin's Ferry, county of Belmont, and State of Ohio, have invented a new and useful improvement in the said machine, for which the above patent was granted; and I do hereby declare the following to be a full, clear, and exact description thereof, reference being had to the accompanying drawings, forming a part of this specification, in which—

Figure 1 is a longitudinal vertical section of a machine embodying my invention. Fig. 2 is a perspective view, parts of the machine being broken away to show the thrashing mechanism. Fig. 3 shows a grated concave used in thrashing wheat and other grain. Fig. 4 shows the tooth used in the improved thrasher.
The same letters refer to the same or corresponding parts wherever they occur.

My invention consists in certain novel features, hereinafter more fully described, and specifically pointed out in the appended claims.
In the drawings, $a$ indicates the usual feed board or table upon which the grain is placed while feeding it into the machine. The longitudinal corrugated feed-roll, placed at the end of this feed-board in the above-mentioned Patent No. 211,472, is dispensed with, and its use (to retard the grain while the teeth of the cylinder should operate upon it) is provided for by the grated concave, Fig. 3, and the curved or bent tooth.
B indicates the thrashing-cylinder, armed with a series of teeth, bent back or curved, $c$, preferably arranged in spiral lines around the cylinder, and yet so spaced and in sufficient number as to strike at all points along the surface of the concave. The advantage of the bent or curved teeth consists in the fact that they furnish about three inches of serrated tooth, having nearly the same curve as the concave and following closely upon it, though not so close as to break any grain, thereby providing a rubbing action for heads and parts of heads broken from the stalk, which are thrashed only by such action, in connection with the drawing, combing action of the straight part of the same tooth, thus especially providing for a felt want in those sections where grain is harvested with headers.

D indicates the grated concave used in thrashing wheat, oats, rice, and other various kinds of grain. It is formed of parallel bars placed one-half inch apart, with cross-sections dividing these spaces into less than two inches in length, forming a kind of lattice-like surface, which permits the grain to readily pass through into the fanning-mill below, while the straw and heads are forced over onto the straw-carriers $e$ and $f$, and providing at the same time a rough surface over which the bent tooth drags the heads, and so rubs out the grain, serving thus the double purpose of a thrasher and separator, avoiding the necessity of the corrugated feed-rolls and beaters, as provided for in the aforesaid Patent No. 211,472. (See Fig. 3.)

Letters $e, f, g, h, i$, and $j$ show the other parts of the machine as set out in Letters Patent No. 211,472, as aforesaid, and are only noticed here for the purpose of showing the relation of my invention to said machine.

In thrashing grain the devices will operate as follows: Power being applied and the thrashing-cylinder being revolved, the grain, with the heads forward and the straw at right angles to the cylinder, will be pushed forward in the usual manner (without the corrugated feed-roll) upon the chute $a$ till the notched teeth $c$ in the cylinder $b$ will strike it with a drawing, combing action, which, as the grain stands at an angle to the stalk, will separate the grain from the heads, while single heads, or parts of heads broken from the stalk before entering the machine, or tangled grain, will be forced against the concave both by the bent tooth and the centrifugal force of the revolving cylinder, and will be thrashed out by the bent or curved teeth passing over the grates or bars of the grated concave $d$. The grain, as it is thrashed, will at once pass down through the grated concave $d$, over the chute $g$, into the fanning-mill $h\ i\ j$, where it will be cleaned and delivered, while the straw and straw-heads will be forced over the grated concave $d$ onto the straw-carriers $e$ and $f$, and thus be conducted out of the machine. If grain harvested by headers is fed into this machine, the operation will be similar to that of heads or parts of heads broken from the stalk before entering the machine, as above described.

In conjunction with my improvements I have shown a fan, $h$, and vibrating sieves and screens $i$ common to this class of machines, also straw-carriers $e$ and $f$, but have not called particular attention to these, as they form no part of the present invention.

The advantages of my invention as an improvement upon the above-mentioned machine, patented January 21, 1879, No. 211,472, are not only the perfect manner in which the thrashing is done without breaking the straw or injury to the grain, but also doing the work with greater speed and with still less power, less danger, and less expense, because I use less machinery and more simple in construction.

Having thus described the nature and advantages of my invention, what I claim, and desire to secure by Letters Patent, is—

1. The thrashing-machine tooth, wedge-shaped in cross-section with smooth sides and notched or serrated upon its front edge, bent to almost a right angle, the bent part taking the curve of the concave over which it passes, substantially as and for the purpose specified.

2. The combination, in a thrashing-machine, of a cylinder provided with notched or serrated teeth, wedge-shaped in cross-section, with smooth sides and bent back to almost a right angle, the bent part taking the curve of the concave over which it passes, and a grated concave devoid of teeth.

In testimony whereof I, the said EDWIN R. JONES, have hereunto set my hand.

EDWIN R. JONES.

Witnesses:
 WM. D. COCHRAN,
 L. J. C. DRENNEN.